UNITED STATES PATENT OFFICE.

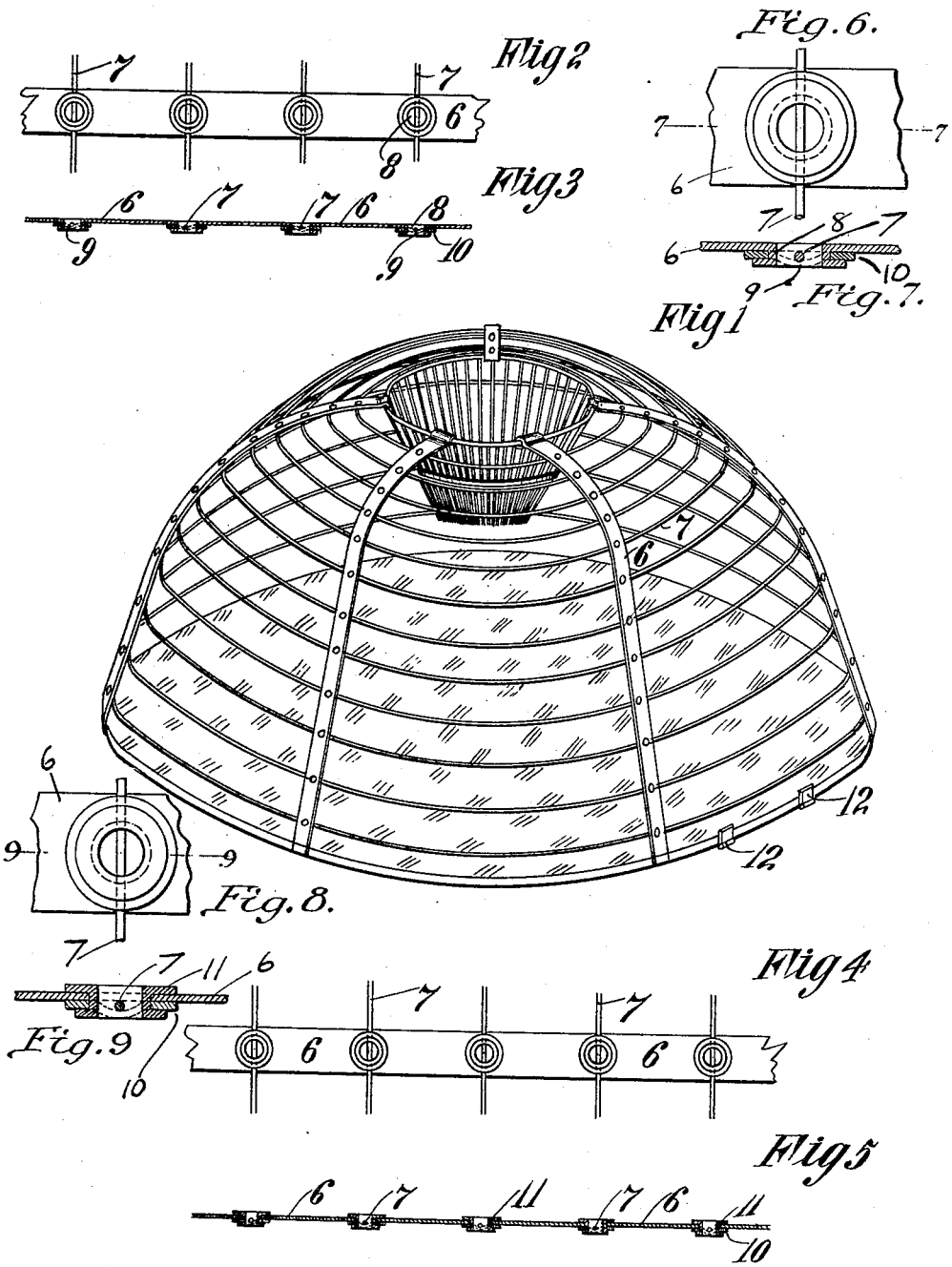

IDA BING, OF NEW YORK, N. Y.

METALLIC FABRIC.

1,055,509. Specification of Letters Patent. Patented Mar. 11, 1913.

Application filed April 2, 1910. Serial No. 553,019.

*To all whom it may concern:*

Be it known that I, IDA BING, a citizen of the United States, residing at the borough of the Bronx, in the county of New York and State of New York, have invented certain new and useful Improvements in Metallic Fabrics, of which the following is a specification, reference being had therein to the accompanying drawing.

My invention relates to improvements in metallic fabrics and has particular reference to and is illustrated in the accompanying drawings in its application to what is generally known as a mouse or rat trap.

To this end the invention comprises certain new and useful means for securing the wires of the trap in position as more particularly illustrated in the accompanying drawings in which—

Figure 1 is a perspective view of a trap illustrating an application of my invention. Fig. 2 is a plan view partly broken away illustrating a strip of material such as a stay to which the wires are attached. Fig. 3 is a longitudinal section of the same. Fig. 4 illustrates a similar strip of material or stay and shows the use of rivets or eyelets for attaching the wires. Fig. 5 is a side view of the same, and Figs. 6 to 9 inclusive represent on an enlarged scale the joints or means for securing the wires to the stays as set forth in Figs. 3 and 5.

These strips form the uprights or stays 6 of the trap to which the wires such as 7 are secured. These strips may be punched so as to provide shoulders or shanks such as 8 through which holes such as 9 may be formed to receive the wires of the trap. Washers such as 10 may then be pressed over the ends of the shanks and the entire structure may be pressed flat to hold the wires and strip firmly in position. In the modification shown in Figs. 4 and 5, rivets or eyelets such as 11 may be employed and inserted after the holes have been made in the strip. The washers 10 may then be applied in the usual manner and the end of the shank may be crushed down to securely hold the combination in place.

The bottom of the trap, is preferably formed out of tin or other sheet metal provided with projections or lugs such as 12 which may be bent around the lower wire of the trap to form a hinge.

Of course it will be understood that various other modifications may be made without departing from the spirit of the invention as set forth in the claim.

I claim:

In an article of the class described, stays, wires secured thereto by eyelets, holes through said stays adapted to receive said eyelets, said eyelets projecting through said stays and having holes through the projecting portions of their shanks adapted to receive said wires.

In testimony whereof I affix my signature in presence of two witnesses.

IDA BING. [L. S.]

Witnesses:
 LIZZIE WEISS,
 SIGMUND ROLLINK.

---

Copies of this patent may be obtained for five cents each, by addressing the "Commissioner of Patents, Washington, D. C."